US011796761B2

(12) United States Patent
Chia et al.

(10) Patent No.: US 11,796,761 B2
(45) Date of Patent: Oct. 24, 2023

(54) HIGH RESOLUTION, WIDE FOV STATIC LENS ASSEMBLY

(71) Applicant: Logitech Europe S.A., Lausanne (CH)

(72) Inventors: Hsu Ting Chia, Hsinchu (TW); Ian Chen, Taichung (TW)

(73) Assignee: Logitech Europe S.A., Lausanne (CH)

(*) Notice: Subject to any disclaimer, the term of this patent is extended or adjusted under 35 U.S.C. 154(b) by 718 days.

(21) Appl. No.: 16/718,873

(22) Filed: Dec. 18, 2019

(65) Prior Publication Data

US 2021/0191077 A1 Jun. 24, 2021

(51) Int. Cl.
| | |
|---|---|
| *G02B 9/62* | (2006.01) |
| *G02B 7/02* | (2021.01) |
| *H04N 23/55* | (2023.01) |
| *H04N 5/225* | (2006.01) |
| *G02B 3/00* | (2006.01) |
| *G02B 27/00* | (2006.01) |
| *H04N 23/698* | (2023.01) |

(52) U.S. Cl.
CPC ............... *G02B 9/62* (2013.01); *G02B 7/021* (2013.01); *H04N 23/55* (2023.01); *G02B 27/0025* (2013.01); *G02B 2003/0093* (2013.01); *H04N 23/698* (2023.01)

(58) Field of Classification Search
CPC ...... G02B 13/0045; G02B 9/62; G02B 7/021; G02B 27/0025; G02B 2003/0093; H04N 5/2254; H04N 5/23238
See application file for complete search history.

(56) References Cited

U.S. PATENT DOCUMENTS

| | | | | |
|---|---|---|---|---|
| 9,874,718 | B2* | 1/2018 | Lee | G02B 13/0045 |
| 10,564,395 | B2* | 2/2020 | Jia | G02B 13/04 |
| 10,649,180 | B2* | 5/2020 | Oinuma | G02B 1/041 |
| 2017/0248770 | A1* | 8/2017 | Chen | G02B 9/62 |
| 2017/0307851 | A1* | 10/2017 | Chen | G02B 9/60 |
| 2018/0011293 | A1* | 1/2018 | Hsueh | G02B 9/62 |
| 2018/0095245 | A1* | 4/2018 | Kanzaki | G02B 9/64 |
| 2018/0157007 | A1* | 6/2018 | Kim | G02B 13/06 |
| 2018/0284397 | A1* | 10/2018 | Komiyama | G02B 13/06 |
| 2018/0372996 | A1* | 12/2018 | Bone | G02B 13/18 |
| 2019/0212532 | A1* | 7/2019 | Yuza | G02B 7/021 |
| 2019/0265438 | A1* | 8/2019 | Sekine | G02B 7/021 |
| 2019/0302421 | A1* | 10/2019 | Chang | G02B 13/005 |
| 2019/0324232 | A1* | 10/2019 | Yang | G02B 9/64 |
| 2020/0081231 | A1* | 3/2020 | Komiyama | G02B 13/16 |
| 2020/0103620 | A1* | 4/2020 | Kim | G02B 9/64 |
| 2021/0033820 | A1* | 2/2021 | Huang | G02B 13/04 |
| 2022/0082793 | A1* | 3/2022 | Luan | G02B 13/0045 |

* cited by examiner

*Primary Examiner* — Ephrem Z Mebrahtu
(74) *Attorney, Agent, or Firm* — KILPATRICK TOWNSEND & STOCKTON LLP (57) ABSTRACT

A static lens system is disclosed and includes the following in one embodiment: a lens assembly housing defining a front opening; an imaging sensor; a lens assembly disposed within the lens assembly housing and comprising: first, second, third, fourth, fifth and sixth lens elements, the sixth lens element being adjacent to the imaging sensor and the first lens element being adjacent to the front opening; wherein the first through third and sixth lens elements are concave lenses have a negative focal length and the fourth and fifth lens elements are concave lens and have a positive focal length.

9 Claims, 6 Drawing Sheets

HIGH RESOLUTION, WIDE FOV STATIC LENS ASSEMBLY

BACKGROUND

Lens systems with multiple lens elements are well known for cameras. For a static lens, obtaining a wide field of view (FOV) can be challenging because of the resulting distortion. Most fisheye lenses have poor corner modulation transfer functions (MTF), causing distortion around the edges. Modern consumer electronic devices also have small form factors, making it desirable to have cameras which do not take up much room on the device. It is desirable to have a static lens system with a wide FOV and minimal distortion and aberrations, which can be used for a video conferencing system.

SUMMARY

This disclosure describes various embodiments that relate to compact static lens assemblies.

A static lens system is disclosed and includes the following in one embodiment: a lens assembly housing defining a front opening; an imaging sensor; a lens assembly disposed within the lens assembly housing and comprising: first, second, third, fourth, fifth and sixth lens elements, the sixth lens element being adjacent to the imaging sensor and the first lens element being adjacent to the front opening; wherein the first through third and sixth lens elements are concave lenses have a negative focal length and the fourth and fifth lens elements are concave lens and have a positive focal length.

In one embodiment, an aperture stop is provided between the third and fourth lens elements, and a field stop is provided between the fourth and fifth lens elements. An IR filter is provided between the sixth lens element and the imaging sensor. The first and second lens elements have curvatures that increase the FOV, while the fifth and sixth lens elements have curvatures that reduce color aberrations. All the lens elements are spherical lenses.

Preferably, the FOV is at least 75 degrees and the F-Theta distortion is less than 3.5%. In one embodiment, the lens design provides a FOV of 79.5 degrees and an F-Theta distortion of less than 3%. Lens elements 1 and 2 are used to increase the FOV. Lens elements 5 and 6 are used to reduce color aberration.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Aspects of the present disclosure relate generally to optics for imaging devices, and in particular to optics suitable for use with videoconferencing devices, according to certain embodiments.

In the following description, various embodiments of a small form-factor imaging device will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Compact, high-resolution lens assemblies can help bring high quality imagery to a relatively small form factor device. Simply increasing the resolution of an imaging sensor without commensurately improving the quality of the optics supporting that imaging sensor may only result in higher bandwidth streams of imagery. An overall quality of the lens should be designed so that each pixel of the imaging sensor can be resolved. In today's market where 2k and 4k video are becoming more common, keeping a small form factor and overall cost of the lens assembly competitive while also resolving the additional detail made possible by higher density image sensors is challenging.

These and other embodiments are discussed below with reference to FIGS. 1-6; however, those skilled in the art will readily appreciate that the detailed description given herein with respect to these figures is for explanatory purposes only and should not be construed as limiting.

Figure 1:
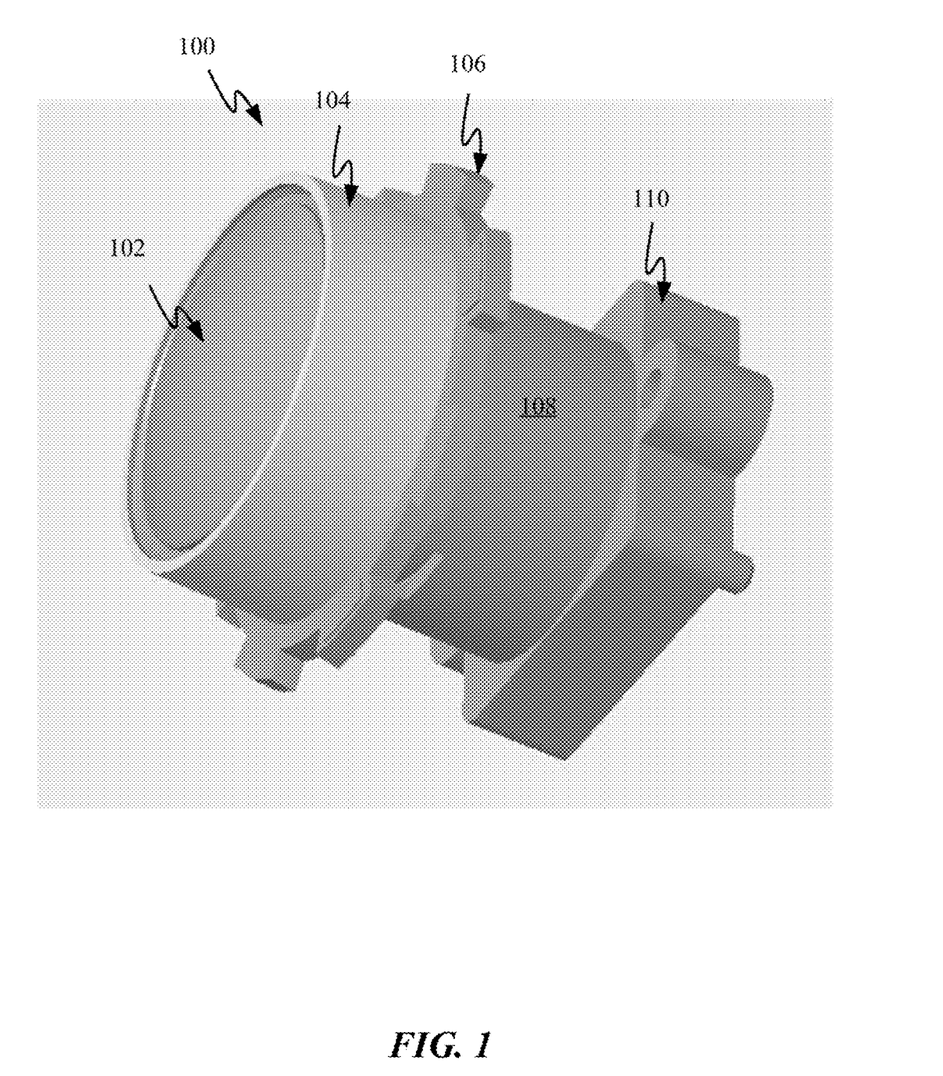
FIG. 1 shows a perspective view of an exemplary camera module suitable for use with the described embodiments.

FIG. 1 shows a perspective view of an exemplary camera module 100 suitable for use with the described embodiments. Camera module 100 includes a protective cover 102 over a lens housing 108 enclosing a lens assembly and mounted on a base 110. A cylindrical ring 104 is connected to ring 106. Ring 106 with knobs can be rotated for assembly during manufacturing to achieve the proper distance. The components of module 100 can be formed from metal or polymeric materials. Protective cover 102 can have a negligible amount of magnification and be optically clear to allow the lens assembly within lens housing 108 to operate without substantial degradation. In some embodiments, protective cover 106 can be sealed to cylindrical ring 102 to prevent moisture from intruding into an interior volume defined by lens housing 108.

Figure 2:
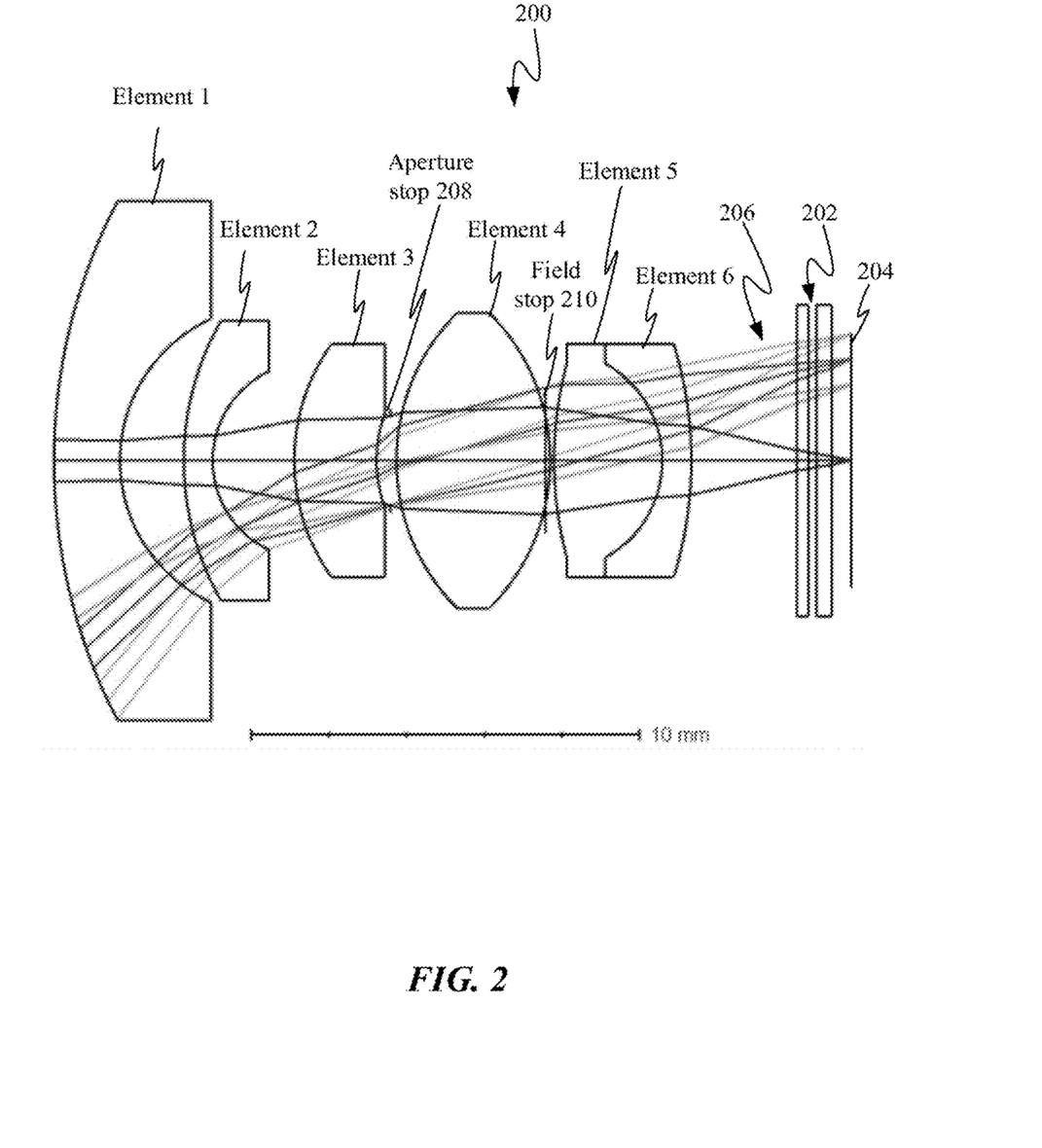
FIG. 2 shows a cross-sectional view of lens elements making up a lens assembly according to an embodiment.

FIG. 2 shows a cross-sectional view of lens elements making up a lens assembly 200. FIG. 2 shows the lens elements positioned to minimize an overall focal length of lens assembly 200. Lens assembly 200 is made up of from front to back lens elements 1-6. The lens elements form a (−) (−) (−) (+) (+) (−) arrangement of negative and positive focal length elements. The lens elements in one embodiment are all made of glass, to improve performance and reduce manufacturing complexity. In some embodiments, the lens elements are designed to provide minimal F-Theta distortion without resorting to expensive molding glass.

Lens elements 5 and 6 are used to reduce color aberration. Color or chromatic aberration from earlier lens elements cause different wavelengths of light (different colors) to have differing focal lengths. Lens elements 5 and 6 are an achromatic doublet that brings different colors (in particular red and blue) to the same focus. Alternately, other lens shapes could be used to correct the chromatic aberrations.

At the back of the lens group is an IR filter 202 and a sensor 204. The IR filter is an infrared light blocking element or coating preventing most infrared light from reaching digital sensor 204. In some embodiments, the infrared coating can block 98-99% of light having a wavelength between 700 nm and 1000 nm. This IR filter can prevent degraded image capture performance caused by IR light being incorrectly captured and presumed to be visible light. It should be noted that in some embodiments, the IR filter could instead be a coating added to one surface of lens element 6, removing the need for a separate IR filter 202. An IR filter coating could also take other forms such as a film layer adhered to one side of another lens element.

Table (1) depicted below shows various other exemplary technical features of lens assembly 200 depicted in FIG. 2. It should be noted that other designs, materials and other technical features may vary and the below technical specifications should not be construed as limiting.

material shows "Glass", then it is the width of the lens element. The last column shows the distance of each element to the image sensor, in mm. In embodiments, the total focal length is less than 3 mm, with a total distance, or "length" of the lens being less than 30 mm. In the embodiment shown in Table 1, the numbers provided account for a total focal length of 2.4 mm, with a total distance, or depth of the lens, being 20.524 mm.

In the embodiment shown in Table 1, the focal length of each of the first and second lens elements is less than a quarter of the focal length of the third lens element. The focal length of the fourth and fifth lens elements are each less than two thirds of the focal lengths of the first and second lens elements, and are opposite in sign. The fifth and sixth lens elements are coupled together, with a convex surface of the fifth lens element mating with a concave surface of the sixth lens element.

In alternate embodiments, the focal lengths and distances to the image sensor may be varied slightly within a range and still provide good results. In particular, a change in the value of one element within the acceptable range can be

TABLE 1

| Element | R1 | R2 | Material | Index | Abbe number | Focal Length | Distance | Distance to Image sensor |
|---|---|---|---|---|---|---|---|---|
| 1 | | | Glass | 1.835 | 40.7 | −7.152 | 1.7 | |
| | | | (Air Gap) | | | | 1.813 | |
| 2 | | | Glass | 1.697 | 63.4 | −6.009 | 0.743 | 16.268 |
| | | | (Air Gap) | | | | 1.921 | |
| 3 | | | Glass | 1.62 | 32.2 | −33.933 | 2.119 | 12.228 |
| | | | (Air Gap) | | | | 0.35 | |
| | | | Aperture Stop | | | | | |
| | | | (Air Gap) | | | | 0.162 | |
| 4 | | | Glass | 1.871 | 42.7 | 3.719 | 3.958 | 7.758 |
| | | | (Air Gap) | | | | −0.122 | |
| | | | Field Stop | | | | | |
| | | | (Air Gap) | | | | 0.225 | |
| 5 | | | Glass | 1.618 | 55.5 | 3.885 | 2.786 | 4.869 |
| | | | (Air Gap) | | | | 0 | |
| 6 | | | Glass | 1.946 | 19.3 | −4.491 | 0.748 | 4.121 |
| | | | (Air Gap) | | | | 2.721 | |
| 7 | | | Glass (IR Cut) | 1.5168 | | 100000 | 0.3 | 1.1 |
| | | | (Air Gap) | | | | 0.2 | |
| | | | Glass (Sensor Top Cover) | | | | 0.4 | |
| | | | (Air Gap) | | | | 0.5 | |
| | | | Sensor | | | | | |
| | | | Total Track | | | | 20.524 | |

Focal Length 2.4
Image sensor Size: SONY IMX317 (Image height = 3.56 mm - radius)
Lens Image circle: 6.5 mm (Diameter)
Image sensor Size: SONY IMX335 (Image height = 3.24 mm - radius)
Lens Image circle: 6.5 mm (Diameter)

Table (1) shows preferred characteristics of each of lens elements 1-6 and IR filter 202 (element 7). The lens material, glass, is shown for each element, along with the intermediate air gaps. An index of refraction of the lens material is then shown, along with the locations of the aperture stop and field stop. Next, the Abbe number of each lens element is shown. The Abbe number, also known as the V-number or constringence of a transparent material, is a measure of the material's dispersion (variation of refractive index versus wavelength). High values of V indicate low dispersion. Higher Abbe values indicate less chromatic aberration. Next, the focal length of each lens element (in millimeters) is shown. Next, the distance from the previous element or width of a lens element is shown. If the material is "air gap", then the distance from the previous lens element is shown. If the compensated for by changes in the value of one or more other elements, within their ranges. Such acceptable ranges are set forth in the equations below in Table (2).

TABLE 2

| No. | Acceptable range | Description |
|---|---|---|
| 1 | $-3.3 < f1/f < -2.6$ | f1 is the focal length of element 1; f is the overall focal length of the lens (elements 106) |
| 2 | $-3.0 < f2/f < -2.4$ | f2 is the focal length of element 2 |

TABLE 2-continued

| No. | Acceptable range | Description |
| --- | --- | --- |
| 3 | 0.6 < \|f/f3\| + \|f/f4\| < 1 | f2 is the focal length of element 2, f3 is the focal length of element 3 |
| 4 | 1.1 < \|f/f5\| + \|f/f6\| < 1.5 | F5 is the focal length of element 5, f6 is the focal length of element 6 |
| 5 | 256 < Vd2 − Vd3 < 40 | Vd2 is the Abbe number of element 2, Vd3 is the Abbe number of element 3 |
| 6 | 30 < Vd5 − Vd6 < 45 | Vd5 is the Abbe number of element 5, Vd6 is the Abbe number of element 6 |

Figure 3:
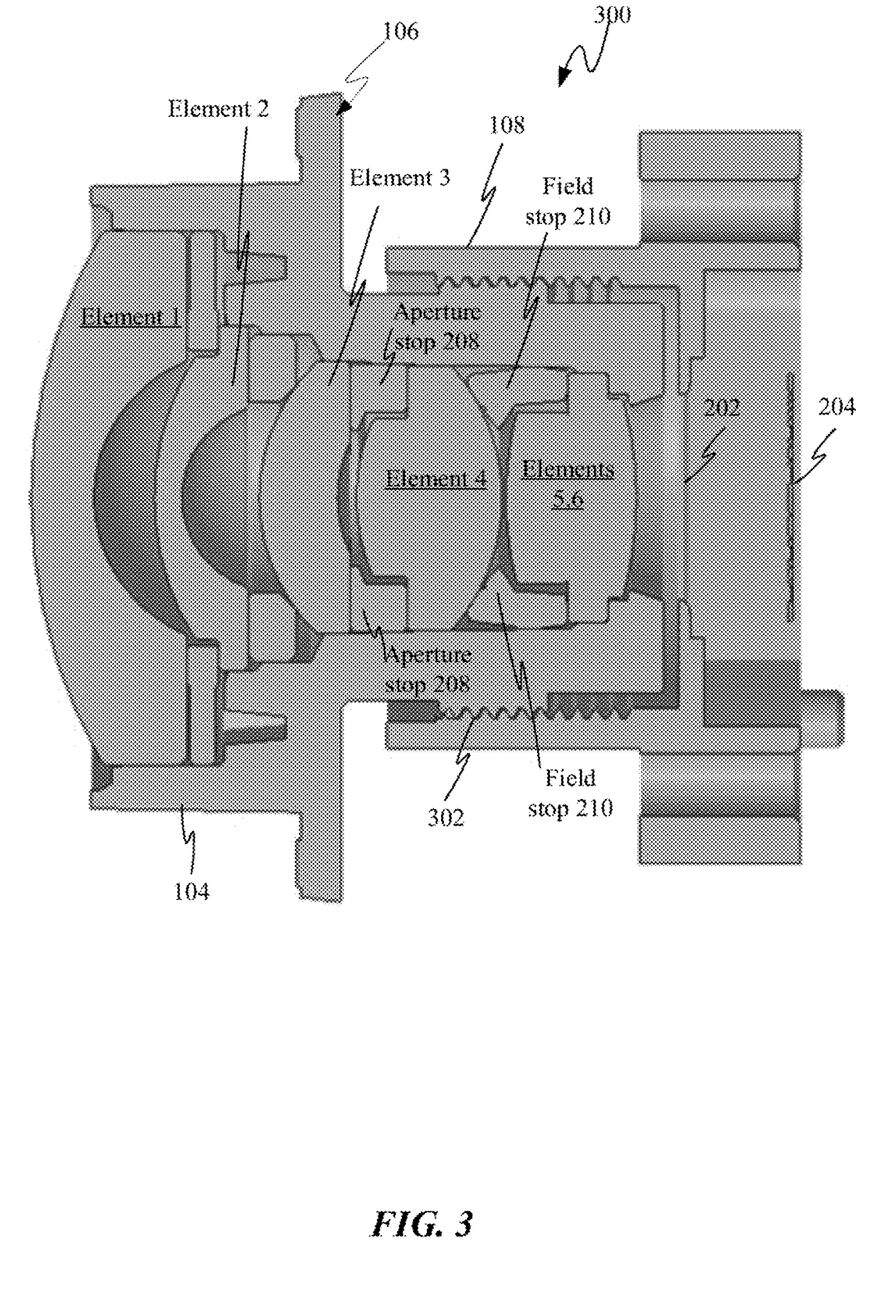
FIG. 3 shows a cross-section view of a lens assembly that illustrates how the lens elements are positioned within a lens housing according to an embodiment.

FIG. 3 shows a cross-sectional view of lens assembly 300 positioned within lens assembly housing 300. As depicted, lens assembly housing 300 can be a multi-part housing that includes ring/cylinder housing 104 and lens housing 108. Housing 104 contains lens elements 1-6, aperture stop 208 and field stop 210. Housing 104 can be screwed into lens housing 108 using threaded surfaces 302 for assembly during manufacturing. The IR filter 202 and imaging sensor 204 are mounted in lens housing 108. By turning housing 104 using knobbed ring 106, the distance between lens elements 1-6 and the imaging sensor can be varied.

Figure 4:
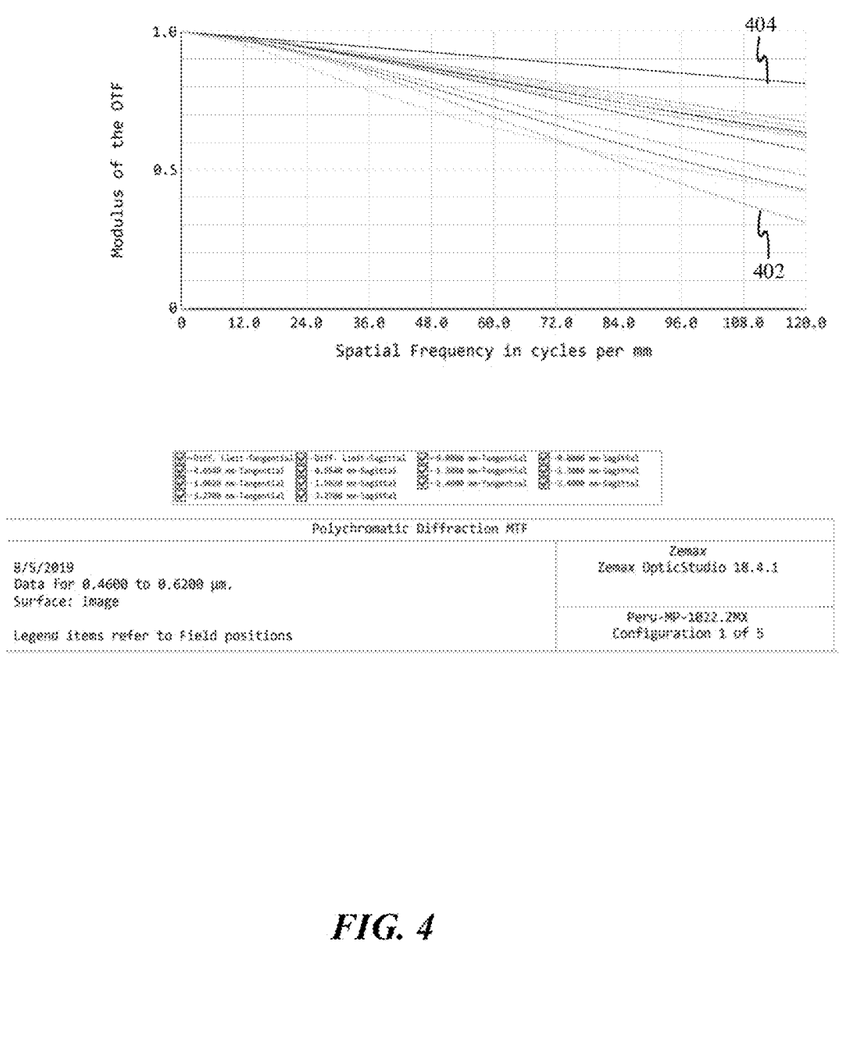
FIG. 4 shows modulation transfer function (MTF) charts for the lens assembly of FIG. 2 according to an embodiment.

FIG. 4 shows modulation transfer functions (MTF) charts for the focal lengths of lens assembly 200. MTF is the spatial frequency response of an imaging system or element. It is the contrast at a given spatial frequency relative to low frequencies. MTF is a useful measure of true or effective resolution, since it accounts for the amount of blur and contrast over a range of spatial frequencies. FIG. 4 shows the modulus of the Optical Transfer Function (OTF) versus spacial frequency. These curves illustrate the high resolution capabilities of lens assembly 200. The curves shown range from curve 402 (0.6540 mm—Tangential) to curve 404 (differential limit—tangential).

Figure 5:
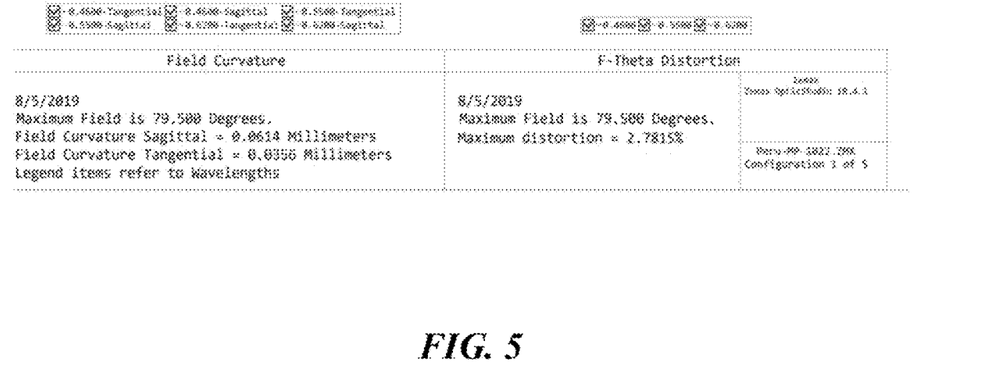
FIG. 5 shows sagittal and tangential field curvature lines representing change in field curvature across a field of view of the lens assembly depicted in FIG. 2.
Figure 5A:
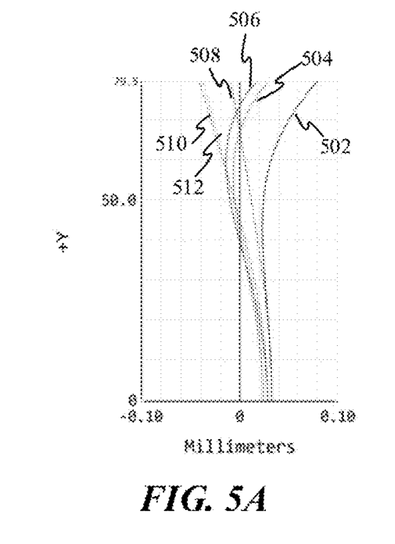

FIG. 5 shows sagittal and tangential field curvature lines representing change in field curvature across a field of view of lens assembly 200 for lens assembly 200. FIG. 5A plots the field curvature for different colors, as shown on a plot of degrees versus mm. FIG. 5A shows curves 502 (0.4600—tangential), 504 (0.5500—tangential), 506 (0.6200—tangential), 508 (0.4600—sagittal), 510 (0.6200—sagittal) and 512 (0.5500—sagittal). For a maximum field of 79.5 degrees, the maximum field curvature sagittal is 0.0614 mm, and the maximum field curvature tangential is 0.0356 mm.

Figure 5B:
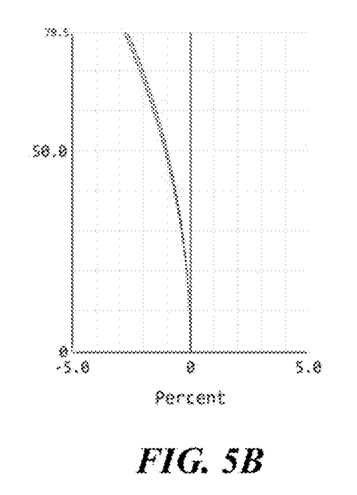

FIG. 5B shows degrees versus percentage of F-Theta distortion. FIG. 5B shows that the field of view (FOV) is 79.5 degrees, and the maximum distortion is 2.7815%.

Examples of Systems for Operating Videoconferencing Devices

Figure 6:
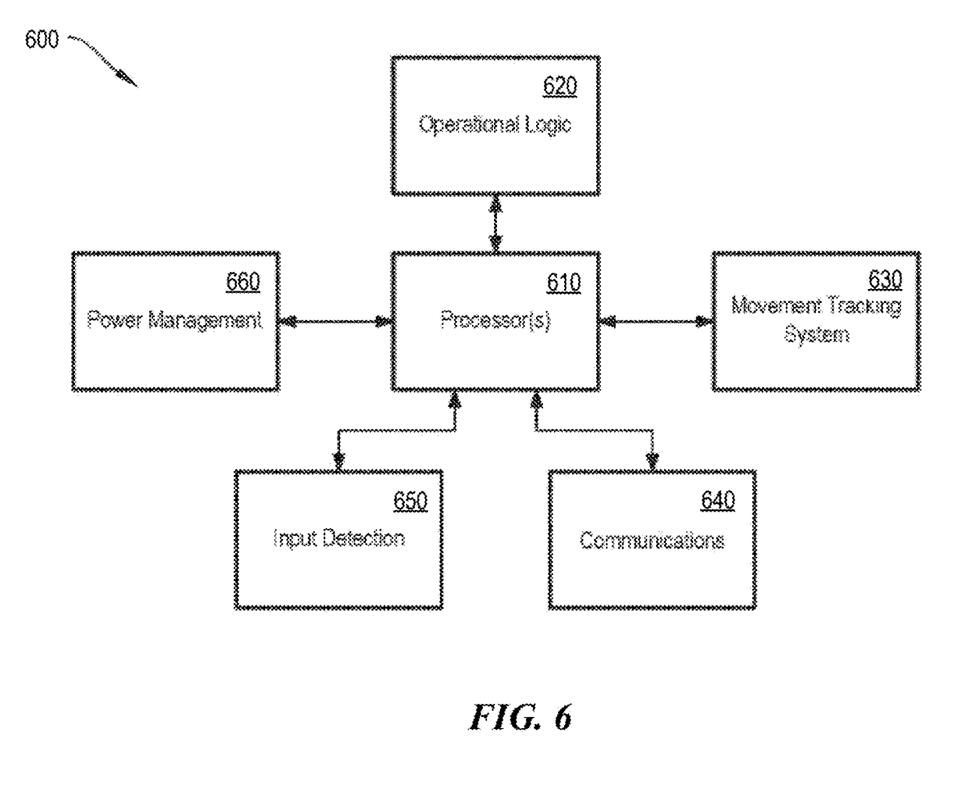
FIG. 6 is a simplified block diagram of a system configured to operate a videoconferencing system, according to certain embodiments.

FIG. 6 is a simplified block diagram of a system 600 configured to control camera module 100, according to certain embodiments. In this embodiment, camera module 100 is used in a video conferencing system. System 600 includes processor(s) 610, operational logic 620, movement tracking system 630, input detection system 650, and power management system 660. Each of system blocks 620-660 can be in electrical communication with the processor(s) 610. System 600 may further include additional systems that are not shown or discussed to prevent obfuscation of the novel features described herein.

In certain embodiments, processor(s) 610 can include one or more microprocessors (μCs) and can be configured to control the operation of system 600. Alternatively, processor(s) 610 may include one or more microcontrollers (MCUs), digital signal processors (DSPs), or the like, with supporting hardware and/or firmware (e.g., memory, programmable I/Os, etc.), as would be appreciated by one of ordinary skill in the art. In some embodiments, multiple processors may provide an increased performance in system 600 speed and bandwidth. It should be noted that although multiple processors may improve system 600 performance, they are not required for standard operation of the embodiments described herein.

Operational logic 620 can include any combination of software, firmware, or hardware that can perform the various steps, operations, and functions associated with videoconferencing system 100, as described above with respect to FIGS. 1-5B. For instance, operational logic 620 can control settings and operating parameters such as recording resolution, focus, magnification and lens assembly azimuth and inclination. Operational logic 620 can be stored in any suitable non-transitory computer-readable storage media that can store program code and/or data that provide the functionality of embodiments of the present disclosure. That is, operational logic 620 can store one or more software programs to be executed by processors (e.g., in processor(s) 610). It should be understood that "software" can refer to sequences of instructions that, when executed by processing unit(s) (e.g., processors, processing devices, etc.), cause system 600 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations described herein. In some embodiments, the memory associated with operational logic 620 can include RAM, ROM, solid-state memory, magnetic or optically-based memory systems, removable media (e.g., "thumb drives," SD cards, flash-based devices), or other types of storage media known in the art. One of ordinary skill in the art would understand the many variations, modifications, and alternative embodiments thereof.

Movement tracking system 630 can be configured to track a movement of participants in a videoconferencing session. In certain embodiments, one or more optical or auditory sensors can be used for movement and active speaker determination. Optical sensors can take the form of infrared sensors for tracking movement toward and away from the videoconferencing device and auditory sensors can take the form of one or more directional microphones for identifying an active speaker. For example, movement tracking system 630 can provide movement data to a host computer to control magnification and orientation of an imaging device. Movement tracking system 630 can report movement information to processor(s) 610.

Communications system 640 can be configured to provide wireless communication between videoconferencing system 100 and a host computing device, according to certain embodiments. Communications system 640 can employ any suitable wireless communication protocol including, but not limited to Bluetooth®-based communication protocols (e.g., BLE), IR, ZigBee®, ZWire®, Wi-Fi (IEEE 802.11), Thread, Logi® protocols, or other suitable communication technology to facilitate wireless bidirectional communication between videoconferencing system 100 and a host computing device. System 600 may optionally comprise a hardwired connection to a host computing device. For example, videoconferencing device 100 can be configured to receive a Universal Serial Bus (e.g., USB-C) cable to enable bidirectional electronic communication between videoconferencing device 100 and a host computing device. Some embodiments may utilize different types of cables or connection protocol standards to establish hardwired communication with other entities.

Input detection system 650 can be configured to detect a touch or touch gesture on one or more buttons, touch sensitive surfaces, or the like, on videoconferencing system 100. Input detection system 650 can include one or more touch sensitive surfaces, touch sensors, buttons, controls, or other user interface, as would be understood by one of ordinary skill in the art. Touch sensors generally comprise sensing elements suitable to detect a signal such as direct contact, electromagnetic or electrostatic fields, or a beam of electromagnetic radiation. Touch sensors can be configured to detect at least one of changes in the received signal, the presence of a signal, or the absence of a signal.

Power management system 660 can be configured to manage power distribution, recharging, power efficiency, and the like, for videoconferencing 100. In some embodiments, power management system 660 can include a battery (not shown), a USB based recharging system for the battery (not shown), power management devices, and a power grid within system 600 to provide power to each subsystem (e.g., accelerometers, gyroscopes, etc.). In certain embodiments, the functions provided by power management system 660 may be incorporated into processor(s) 610. The power source can be a replaceable battery, a rechargeable energy storage device (e.g., super capacitor, Lithium Polymer Battery, NiMH, NiCd), or a corded power supply (e.g., via USB-C port—see FIG. 1). One of ordinary skill in the art would understand the many variations, modifications, and alternative embodiments thereof.

It should be appreciated that system 600 is illustrative and that variations and modifications are possible. System 600 can have other capabilities not specifically described here (e.g., mobile phone, global positioning system (GPS), power management, one or more cameras, various connection ports for connecting external devices or accessories, etc.). Further, while system 600 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatuses including electronic devices implemented using any combination of circuitry and software. Furthermore, aspects and/or portions of system 600 may be combined with or operated by other sub-systems as required by design. For example, operational logic 620 may operate within processor(s) 610 instead of functioning as a separate entity. The foregoing embodiments are not intended to be limiting and those of ordinary skill in the art with the benefit of this disclosure would appreciate the myriad applications and possibilities.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For example, the videoconferencing term should be construed broadly and could also refer to a webcam or action camera. Use of the described lens assembly with other imaging system types such as DSLRs, mirrorless and cinema cameras should also be deemed to be within the scope of contemplated use.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A camera system, comprising:
   a lens assembly housing defining a front opening;
   an imaging sensor;
   a lens assembly disposed within the lens assembly housing and comprising: first, second, third, fourth, fifth and sixth lens elements, the sixth lens element being a closest lens element to the imaging sensor and the first lens element being adjacent to the front opening;
   wherein a ratio of a focal length of the first lens element (f1) to an overall focal length of the first through sixth lens elements (f) is between −3.3 and −2.6 ($-3.3 < f1/f < -2.6$);
   wherein the ratio of a focal length of the second lens element (f2) to an overall focal length of the first through sixth lens elements (f) is between −3.0 and −2.4 ($-3.0 < f2/f < -2.4$); and
   wherein an absolute value of a ratio of an overall focal length of the first through sixth lens elements (f) to a focal length of the third lens element (f3) plus an absolute value of a ratio of the overall focal length of the first through sixth lens elements (f) to a focal length of the fourth lens element (f4) is between 0.6 and 1 ($0.6 < |f/f3| + |f/f4| < 1$).

2. The camera system as recited in claim 1, wherein the fifth lens element is coupled to the sixth lens element, with a convex surface of the fifth lens element mating with a concave surface of the sixth lens element.

3. The camera system as recited in claim 1, further comprising:
an IR filter between the sixth lens element and the imaging sensor:
an aperture stop between the third and fourth lens elements;
a field stop between the fourth and fifth lens elements; and
wherein the first and second lens elements have curvatures configured to increase a field of view (FOV) of the lens assembly, while the fifth and sixth lens elements have curvatures configured to reduce color aberrations.

4. The camera system as recited in claim 1, wherein an absolute value of a ratio of an overall focal length of the first through sixth lens elements (f) to a focal length of the fifth lens element (f5) plus an absolute value of a ratio of the overall focal length of the first through sixth lens elements (f) to a focal length of the sixth lens element (f6) is between 1.1 and 1.5 (1.1<|f/f5|+|f/f6|<1.5).

5. The camera system as recited in claim 1, wherein a difference between an Abbe number of lens element 2 (Vd2) and an Abbe number of lens element 3 (Vd3) is between 256 and 40 (256<Vd2−Vd3<40).

6. The camera system as recited in claim 1, wherein a difference between an Abbe number of lens element 5 (Vd5) and an Abbe number of lens element 6 (Vd6) is between 30 and 45 (30<Vd5−Vd6<45).

7. A camera system, comprising: a lens assembly housing defining a front opening; an imaging sensor; a lens assembly disposed within the lens assembly housing and comprising: first, second, third, fourth, fifth and sixth lens elements, the sixth lens element being a closest lens element to the imaging sensor and the first lens element being adjacent to the front opening; the first through third lens elements are concave lenses, with a surface facing the imaging sensor being concave, and having a negative focal length; and the fourth and fifth lens elements are convex lens having a positive focal length; wherein a ratio of the focal length of the first lens element (f1) to an overall focal length of the first through sixth lens elements (f) is between −3.3 and −2.6 (−3.3<f1/f<−2.6).

8. A camera system, comprising: a lens assembly housing defining a front opening; an imaging sensor; a lens assembly disposed within the lens assembly housing and comprising: first, second, third, fourth, fifth and sixth lens elements, the sixth lens element being a closest lens element to the imaging sensor and the first lens element being adjacent to the front opening; the first through third lens elements are concave lenses, with a surface facing the imaging sensor being concave, and having a negative focal length; and the fourth and fifth lens elements are convex lens having a positive focal length; wherein a ratio of the focal length of the second lens element (f2) to an overall focal length of the first through sixth lens elements (f) is between −3.0 and −2.4 (−3.0<f2/f<−2.4).

9. A camera system, comprising: a lens assembly housing defining a front opening; an imaging sensor; a lens assembly disposed within the lens assembly housing and comprising: first, second, third, fourth, fifth and sixth lens elements, the sixth lens element being a closest lens element to the imaging sensor and the first lens element being adjacent to the front opening; the first through third lens elements are concave lenses, with a surface facing the imaging sensor being concave, and having a negative focal length; and the fourth and fifth lens elements are convex lens having a positive focal length; wherein an absolute value of a ratio of an overall focal length of the first through sixth lens elements (f) to a focal length of the third lens element (f3) plus an absolute value of a ratio of the overall focal length of the first through sixth lens elements (f) to a focal length of the fourth lens element (f4) is between 0.6 and 1 (0.6<|f/f3|+|f/f4|<1).

* * * * *